United States Patent [19]
Heywang et al.

[11] Patent Number: 4,789,213
[45] Date of Patent: Dec. 6, 1988

[54] ELECTRO-OPTICAL MODULATOR HAVING A MONOMODE LIGHT WAVEGUIDE MODULATOR

[75] Inventors: Walter Heywang, Neukeferloh; Peter Baues, Krailling, both of Fed. Rep. of Germany

[73] Assignee: Siemens Aktiengesellschaft, Berlin & Munich, Fed. Rep. of Germany

[21] Appl. No.: 40,729

[22] Filed: Apr. 20, 1987

Related U.S. Application Data

[63] Continuation of Ser. No. 799,203, Nov. 19, 1985, abandoned, which is a continuation of Ser. No. 381,378, May 24, 1982, abandoned.

[30] Foreign Application Priority Data

Jul. 10, 1981 [DE] Fed. Rep. of Germany ....... 3127406

[51] Int. Cl.$^4$ ............................ G02B 6/26; H01J 5/16; G02F 1/00
[52] U.S. Cl. ............................. 350/96.15; 350/96.13; 350/96.14; 350/96.17; 350/96.29; 350/96.30; 250/227; 381/172; 381/173; 381/174; 381/191; 455/606; 455/612; 455/613; 455/614
[58] Field of Search ............... 350/96.10, 96.11, 96.12, 350/96.13, 96.14, 96.15, 96.29, 96.30, 96.16, 96.17; 310/322; 455/606, 607, 609, 610, 612, 614, 613; 250/227; 379/379, 432, 433; 381/114, 111, 172, 173, 174, 191

[56] References Cited

U.S. PATENT DOCUMENTS

| 2,105,010 | 1/1938 | Sawyer | 179/110 A |
|---|---|---|---|
| 3,379,889 | 4/1968 | Stephany | 455/614 |
| 4,056,742 | 11/1977 | Tibbetts | 310/357 |
| 4,070,094 | 1/1978 | Martin | 350/96.13 |
| 4,071,753 | 1/1978 | Fulenwider et al. | 250/227 |
| 4,105,915 | 8/1978 | Clay et al. | 455/600 X |
| 4,250,415 | 2/1981 | Lewiner et al. | 307/400 |
| 4,292,561 | 9/1981 | Martin | 310/322 |
| 4,326,298 | 4/1982 | Fromm et al. | 455/606 |
| 4,330,869 | 5/1982 | Robieux | 455/607 |
| 4,334,321 | 6/1982 | Edelman | 455/614 |
| 4,596,051 | 6/1986 | Feldman | 455/614 |
| 4,678,902 | 7/1987 | Perlin | 250/227 |

FOREIGN PATENT DOCUMENTS

| 2314420 | 10/1974 | Fed. Rep. of Germany . | |
| 2654622 | 6/1978 | Fed. Rep. of Germany | 179/110 A |
| 53-118019 | 10/1978 | Japan | 179/110 A |
| 7502452 | 3/1975 | Netherlands | 179/110 A |

OTHER PUBLICATIONS

Sheem et al., "High Efficiency Single Mode Fiber/Channel Waveguide Flip-Chip Coupling", Conf. Int. and Guided Wave Tech. digest, 28–30, Jan. 1980, pp. 1–4.

Raymond et al., "The Latest in Instrumentation Quality Microphones", Sound and Vibration, May 1974, vol. 8, No. 5, pp. 4 and 6.

Unterberger et al., "Application of Optical Transmission . . . ", Siemens A. G. zie voor titel boek, pp. 383–387.

(List continued on next page.)

Primary Examiner—William L. Sikes
Assistant Examiner—Brian M. Healy
Attorney, Agent, or Firm—Hill, Van Santen, Steadman & Simpson

[57] ABSTRACT

An electro-optical modulator has a monomode light waveguide modulator for which a pressure-sensitive signal generator is provided as a signal source for the purpose of modulating a light power signal supplied to the monomode light waveguide modulator over an input light waveguide, the electrical output of the signal generator being either directly or indirectly connected to an electrical input of the monomode light waveguide modulator. The arrangement serves for the transmission of signals representing pressure values, for example, acoustic pressure values, over an optical transmission system, and inasmuch as the electrical signals are generated by the pressure-sensitive signal generator, no external supply devices whatsoever are required at the modulator for the electrical energy.

20 Claims, 3 Drawing Sheets

OTHER PUBLICATIONS

Taylor, H. F., "Optical switching . . . ", J. Appl. Phys., vol. 44, No. 7, Jul. 1973, pp. 3257-3262.

Martin et al., "Fernspiech . . . Ts71", Siemens Zeikschrift, vol. 46 (1972), No. 4, pp. 207-209.

Sasoki, H. et al., "Electro-Optic Y—junction . . . ", Electronics Letters, vol. 12, No. 18, 9/2/76, pp. 259-260.

Keil, et al., "Mach Zehnder Waveguide . . . ", Siemens A. G. Forschungslaboratorien, vol. 9 (1980), No. 1, pp. 26—31.

Fromm I, "Optophon–ein Optisches . . . ", vol. 32 (1978), No. 12, pp. 356-363.

Baues, P, "Intequerte Optische . . . ", Electronik—ansjeiger, vol. 9 (1977), No. 3, pp. 19-22.

Somekh, S. et al., "Channel Optical . . . ", Appl. Phys. Lett., vol. 22, No. 2, 1/73, pp. 46-47.

Sheems et al., "High Efficiency . . . Coupling", Integrated and Guided Wave Optics Test Digest, pp. 28-30, 1/80.

Kaminow, J. P., "Optical Switching . . . Dielectric Waveguides", I Appl. Phys., vol. 44 (1973).

Papuchon M. et al., "Electrically, Switched . . . ":Cobra Appl. Phys. Lett., vol. 27, No. 5, 9/75, pp. 289-291.

Schmidt R. V. et al., "Electro-Optically . . . ". Appl. Phys. Lett., vol. 28, No. 9, 5/76, pp. 503-506.

Kogelnik et al., "Switched Direct Coup . . . ". IEEE Journal of Quant. Elect., vol. QE-12, No. 7, 7/76, pp. 396-401.

Giallorenzi, "Fibre Optic Sensors", Optics and Laser Tech., vol. 13, No. 2, Apr. 1981, pp. 73-78.

Bucaro, "Optical Fiber Acoustic Sensor", Conf: Fiber Optics Advances in Research and Dev., Jun. 1978, pp. 641-655.

Cole et al., "Research Update on Fiber Sensors", Int. Fiber Optics and Comm., vol. 2, No. 2, Mar. 1981, pp. 23-25.

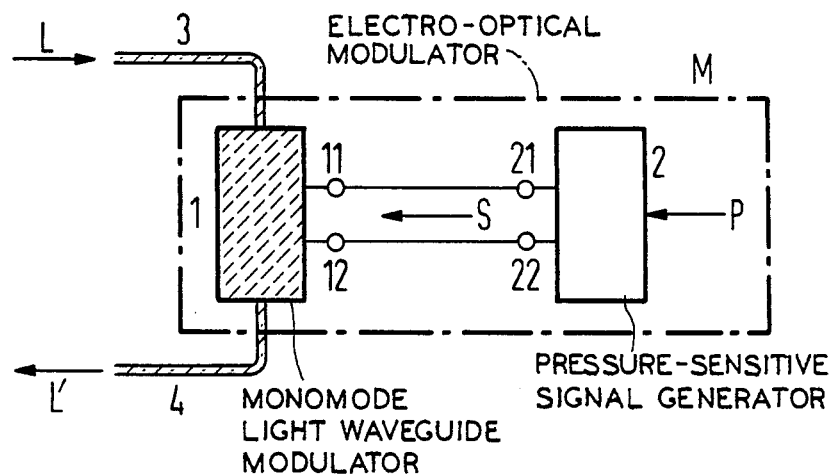
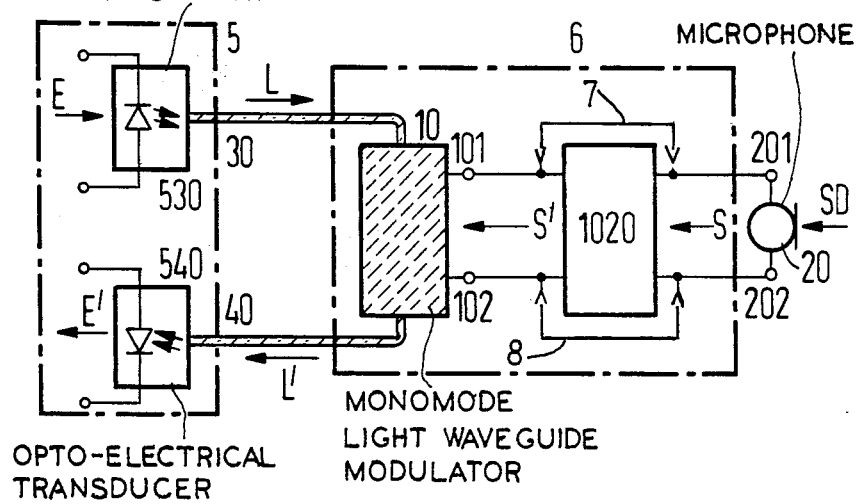

ELECTRO-OPTICAL MODULATOR HAVING A MONOMODE LIGHT WAVEGUIDE MODULATOR

This is a continuation of application Ser. No. 799,203, filed Nov. 19, 1985, now abandoned, which is a continuation of application Ser. No. 381,378, filed May 24, 1982, now abandoned.

BACKGROUND OF THE INVENTION

1. Field of the Invention

The present invention relates to communication devices, and is more particularly concerned with an electro-optical modulator having a monomode light wave guide modulator.

2. Description of the Prior Art

The transmission of messages over light waveguides has a series of advantages. Included among such advantages are essentially: low signal attenuation; high bandwidth; and protection against disruption, particularly against electrical or magnetic fields. Added thereto are the high flexibility, the low weight, and the small dimensions of the light waveguides themselves, as well as the possibility offered by such waveguides of being able to realize potential separations in a simple manner.

Light waveguides are particularly employed in the higher levels of communication networks, particularly in telephone networks. They have already proven themselves in this application.

The transmission of messages, particularly speech, up to the subscriber over light waveguides is presently being tested. Broad-band services, for example, "cable television" and "telecopying", can be offered in the simplest manner with a corresponding transmission technique. The devices for these services are connected to the power supply network at the subscriber. This is not permissible for the operation of the telephone itself. Safety considerations of a technical and other nature play a decisive role here. One skilled in the art is familiar with the safety aspects of a technical nature. Other safety considerations lead to the requirement that a telephone installation remain operational in dangerous situations, even given outage of the power network.

The subscriber devices required for telephony must be supplied, therefore, with electrical energy which is available independently of the power supply network. According to an existing proposal, the subscriber devices are therefore supplied with energy from a exchange battery over copper lines laid in addition to the light waveguides, or they are supplied from batteries which are put in place at the subscriber device.

These additional copper lines or batteries can be eliminated when microphones are created which generate electrical signals in response to pressure and therefore make due without an electrical energy supply and are operational in conjunction with light waveguides. Considerable cost reductions would become possible by so doing.

Known solutions which have been proposed provide the employment of a device in which a light beam is reflected at a diaphragm subject to excursion due to acoustic pressure or pressure in general, being reflected in accordance with the excursion of the diaphragm, whereby a modulation of the input power is achieved, cf., for example, Frequenz 32 (1978), pp. 356-363, Fromm, I.: "Optofon-ein Optisches Übertragungssystem für Sprache". Given such devices, however, one must count on significant tolerance problems, particularly of the moving parts (diaphragm).

SUMMARY OF THE INVENTION

The object of the present invention is to provide an electro-optical modulator which has a rugged and compact mechanical structure and given which the addressed tolerance problems are practically eliminated. Moreover, the electro-optical modulator of the present invention should have small dimensions and low weight. In addition, it should also operate reliably under extreme environmental conditions.

The above object is achieved, according to the present invention, with an electro-optical modulator having a monomode light waveguide modulator which is characterized in that a pressure-sensitive signal generator is provided as the source of an electrical signal to be supplied to the monomode light waveguide modulator for the purpose of modulating light power supplied to the monomode light waveguide modulator over an input light waveguide, the electrical output of the signal generator being directly or indirectly connected to an electrical input of the monomode light waveguide modulator.

Such an electro-optical modulator offers the advantage that it can become compactly constructed, raises practically no tolerance problems, and operates reliably even under extreme environmental conditions.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic circuit diagram for the interconnection of the individual components of an exemplary embodiment of the invention;

FIG. 2 is a schematic circuit diagram of an exemplary embodiment of a particularly advantageous application of use of an electro-optical modulator, namely the realization of an electro-optical microphone for a telephone set which is only connected to a central device by way of light waveguides;

DESCRIPTION OF THE PREFERRED EMBODIMENTS

Figure 3:
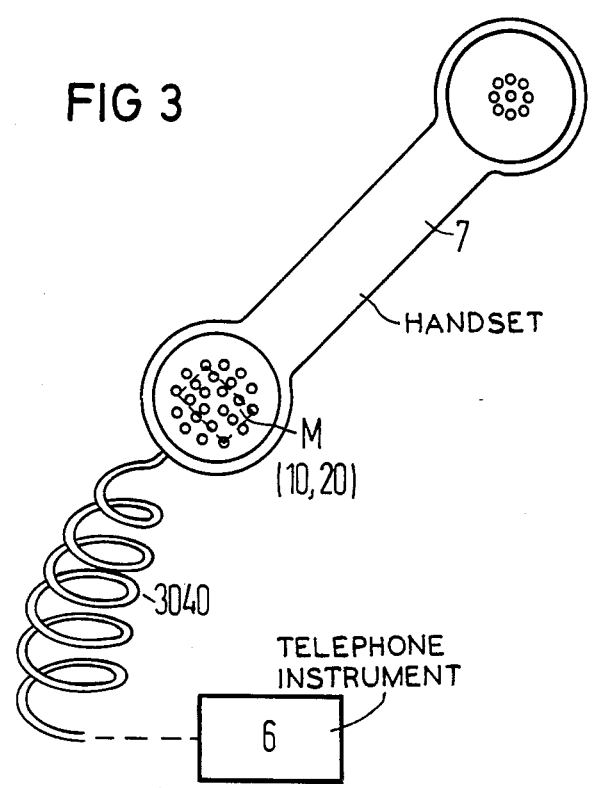
FIG. 3 is a schematic representation of an electro-optical modulator, constructed in accordance with the present invention, which is employed as an electro-optical microphone in a handset of a telephone instrument.

As already set forth above, FIG. 1 schematically illustrates a basic circuit diagram for the interconnection of the individual components of an exemplary embodiment of the invention. According to FIG. 1, an electro-optical modulator M contains a monomode light waveguide modulator 1 and a pressure-sensitive signal generator 2. Light power L is supplied to the monomode light waveguide modulator over an input light waveguide 3. Modulated light power L' is withdrawn from the monomode light waveguide modulator 1 over an output light waveguide 4. An electrical signal S which is emitted by the pressure-sensitive signal generator 2 as a result of the influence of a pressure P is supplied over an electrical output 21, 22 of the pressure-sensitive signal generator 2 to an electrical input 11, 12 of the monomode light waveguide modulator 1.

Viewed electrically, the electro-optical modulator is a capacitor having a capacitance of approximately 50 pF with which the light transmission is controlled, i.e. modulated, by applying a voltage. The input of the electrooptical modulator is capacitively high-resistant and thus ideally suited for the connection of a pressure-sensitive signal generator having a high output impedance.

The monomode light waveguide modulator can be advantageously executed as a directional coupler modulator, as a controllable Y-branching or as a Mach-Zehnder modulator. Such components are known per se, cf. for example, Baues, P. "Integrierte optische Richtkoppler", Elektronik-Anzeiger 9 (1977), No. 3, pp. 19–22; Somekh, S., Garmire, E., Yarif, A, Garvin, H. L., Hunsperger, R. G.: "Channel Optical Waveguide Directional Couplers", Appl. Phys. Lett. 22 (1973), pp. 46–47; Papuchon, M., Combemale, Y., Mathieu, X., Ostrowsky, D. B., Reiber, L., Roy, A. M., Sejourne, B., Werner, W.: "Electrically Switched Optical Directional Coupler", Cobra. Appl. Phys. Lett. 27 (1975), pp. 289–291; Schmidt, R. V., Kogelnik, H.: "Electro-Optically Switched Coupler With Stepped $\Delta\beta$-Reversal Using Ti-Diffused LiNbO$_3$ Waveguides", Appl. Phys. Lett. 28 (1976) pp. 503–506; Kogelnik, H., Schmidt, R. V: "Switched Directional Couplers With Alternating $\Delta\beta$", Trans. IEEE QE-12 (1976), pp. 396–401; Sasaki, H., De la Rue, R. M.: "Electro-Optic Y-Junction Modulator/Switch", Electronics Letters 12 (1976), pp. 459–460; Keil, R., Aurchacher, F.; "Mach-Zehnder Waveguide Modulators in Ti-Diffused LiNbO$_3$", SFEB 9 (1980), No. 1, pp. 26–31; Kaminow, J. P.: "Optical Waveguide Modulators", IEEE MTT-23 (1975), pp. 57–70; and Taylor, H. F.: "Optical Switching and Modulation in Parallel Dielectric Waveguides", I. Appl. Phys. 44 (1973), pp. 3257–3262.

The pressure-sensitive signal generator can be, for example, an electrical voltage modulator or an electrical current modulator. According to a further development of the invention, the signal generator 2 can be an acousto-electrical transducer. According to a further development of the invention, such an acousto-electrical transducer can be a transducer operating according to the piezo effect.

A particularly advantageous application for an electro-optical modulator constructed in accordance with the present invention provides that the transducer operating according to the piezo effect is a piezo-microphone. The structure and manner of operation of a piezo-microphone are known per se cf., for example, Siemens-Zeitschrift 46 (1972), No. 4, pp. 207–209, Martin, E., Müller, E.: "FernsprechPiezomikrofon Ts 71", cf. FIG. 2.

Such a component operating in accordance with the piezo effect can be constructed, as is known, of various materials such as, for example, specific types of ceramic, foils and the like.

However, the principle of the present invention likewise allows the acousto-electrical transducer to be a transducer operating in accordance with the magneto-electrical transformation principle. Moreover, according to another further development of the invention, it is provided that the acousto-electrical transducer is constructed as an elektret microphone. An advantageous, further use application for the present invention provides that the signal generator 2 is a pressure sensor for measuring dynamic or static pressure forces.

It is provided according to a further advantageous development of the invention that a voltage transformer 1020 is provided in a manner known per se for matching the impedances of the light deflector 1 and the signal generator 2. This voltage transformer 1020 can, for example, be constructed as a transformer operating according to the electromagnetic principle, cf. FIG. 2. As also schematically illustrated in FIG. 2 by way of a pair of shunts 7, 8, if matching is not necessary, the transformer 1020 can be omitted.

The input light waveguide 3 can advantageously be executed as a monomode light waveguide. A further advantageous development of the invention provides that an output light waveguide 4, which is realized as a so-called thick core fiber, is employed in order to achieve a low transmission loss.

As already set forth briefly above, FIG. 2 schematically illustrates a basic circuit arrangement of an exemplary embodiment of a particularly advantageous possibility of use of an electro-optical modulator constructed in accordance with the present invention, namely in the realization of an electro-optical microphone for a telephone instrument connected to a central device only over light waveguides. As shown on the drawing, a telephone instrument 6 is connected to an exchange device 5 over light waveguides 30 and 40. In a manner known per se, the exchange device 5 contains an electro-optical transducer 530 for converting an electrical input power signal E into light power L and, accordingly, contains an opto-electrical transducer 540 for the conversion of an outputtable light power L' into an electrical output power signal E' The piezo-microphone 20, or some other suitable pressure-sensitive signal generator, is exposed to an acoustic pressure SD. The arising electrical signal S is supplied over an electrical output 201, 202 to an electrical input 101, 102 of a monomode light waveguide modulator 10. The monomode light waveguide modulator 10 modulates the light power signal L supplied thereto into the output light power signal L' by means of the electrical signal S.

The monomode light waveguide modulators 1 and 10 illustrated in FIGS. 1 and 2 are, as individual components, components which are known per se, as has already been discussed above.

FIG. 2 illustrates that the electro-optical modulator is a component of the telephone instrument 6 connected to the exchange device 5 over the light waveguides 30, 40 and that the telephone instrument 6 exhibits no electrical connection whatsoever to the exchange device 5 and likewise exhibits no external power supply whatsoever.

It is provided according to an advantageous further development of the invention that the monomode light waveguide modulator 10, together with an acoustic pressure-sensitive signal generator, for example, the microphone 20, is spatially accommodated in a hand set 7 for the telephone instrument 6 (FIG. 3) and that an input light waveguide and an output light waveguide extend within a hand set cord 3040 which is disposed between the telephone instrument 6 and the hand set 7. As shown in FIG. 2, however, the monomode light waveguide modulator 10 can also be advantageously accommodated within the telephone instrument 6 itself. Thereby, the electrical output 202, 202 of the acoustic pressure-sensitive signal generator, namely of the microphone 20, is connected to the electrical input 101, 102 of the monomode light waveguide modulator 10 in a conventional manner, namely over two electrical conductors which are in the hand set cord. Such an arrangement is particularly advantageous with regard to the mechanical structure, the saving of weight in the hand set, the realization of the optical connections to the light deflector, among other things.

As already explained, a voltage transformer 1020 is inserted, as needed, between the electrical output of the pressure-sensitive signal generator and the electrical input of the monomode light waveguide modulator for the purpose of matching of the impedances of the two modulator components. As is known, the light generation at the input of the overall device can occur in various manners, for example by means of luminescent diodes, laser diodes or other lasers of any desired type.

Figure 4:
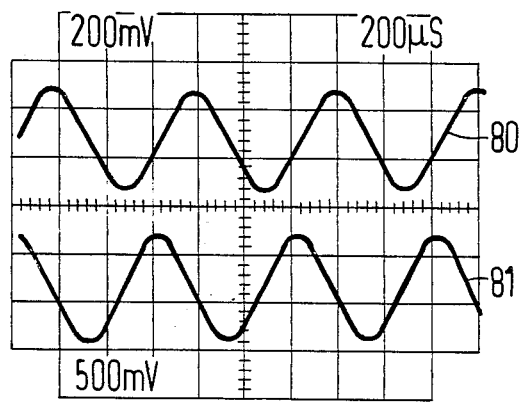
FIG. 4 is a graphic illustration of an oscillogram of input and output signals of a laboratory arrangement in order to demonstrate the functionability of the principle of the invention.

FIG. 4 illustrates an oscillogram of an input signal 80 and of an output signal 81 of a laboratory arrangement in order to demonstrate the operability of the principle of the invention. In addition to the advantageous use of an electro-optical modulator constructed in accordance with the invention in a telephone instrument, advantageous use possibilities are also given whereever pressure forces are to be measured or are to be monitored, and where the advantageous property of signal transmission signals with light conduction, namely the insensitivity to electrical or magnetic disruptive influences is to be exploited.

Figure 5:
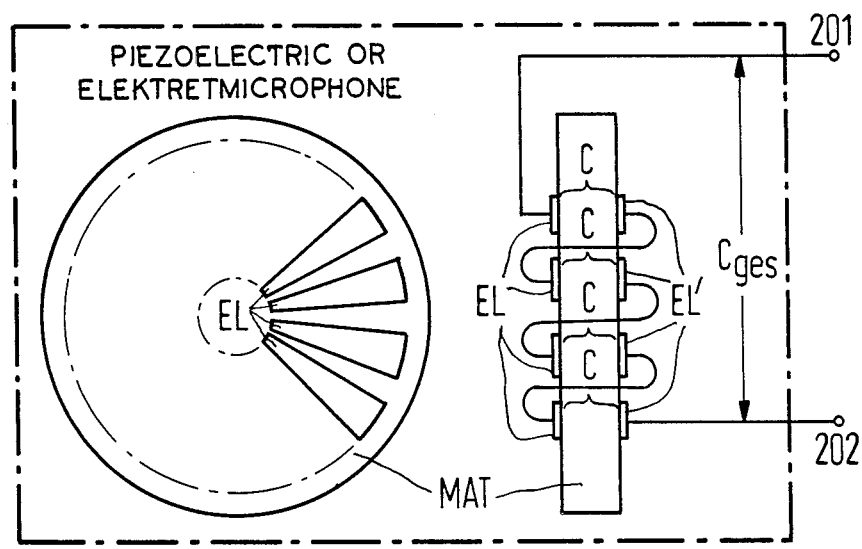
FIG. 5 is a schematic representation of an advantageous structure of a piezo-microphone or elektret microphone having a plurality of individual capacitances connected in series.

According to an advantageous further development of the invention, the overall capacitance $C_{ges}$ of these arrangements, as illustrated in FIG. 5, can be subdivided into a plurality of individual capacitances C which are then to be interconnected in series for the purpose of matching the capacitances of the electro-optical modulator and piezo-microphone or, respectively, elektret microphone. The voltage arising at each individual capacitance as a result of the sound is multiplied in accordance with the plurality of individual capacitances.

The piezo-microphone can consist of ceramic, for example, VIBRIT, or of a synthetic piezo film, for example, $PVF_2$. The elektrets employed can likewise be synthetic films.

A possibility for the realization of the electrode subdivision can be seen by way of excerpt in FIG. 5. A round wafer consisting of piezo or elektret material MAT is provided with triangular electrodes EL or, respectively, EL' on the top and bottom surfaces. The electrodes taper towards the center of the wafer, and as indicated, they are connected in series.

The series connection of electrodes is known per se. For example, the same is disclosed in the German Pat. No. 2,314,420 with respect to a piezo-electrical key.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. An electro-optical light modulator comprising:

a pressure-sensitive signal generator including an output and operable in response to the application of pressure to produce an electrical signal at said output, said pressure-sensitive signal generator comprising an acousto-electrical piezo-electric transducer including a wafer of piezomaterial, a plurality of electrodes and counter-electrodes on said wafer forming a plurality of capacitors, and means connecting said capacitors in series so that the voltages derived from the individual capacitors add to provide the electrical signal; and monomode light waveguide modulator means including a light input for receiving a light signal, a light output for emitting a modulated light signal, and an electrical input connected to said output of said signal generator, and operable to modulate the light signal in response to said electrical signal.

2. The electro-optical modulator of claim 1, wherein: said monomode light waveguide modulator means comprises a Mach-Zehnder modulator.

3. The electro-optical modulator of claim 2, wherein: said Mach-Zehnder modulator comprises a Y branching.

4. The electro-optical modulator of claim 2, wherein: said Mach-Zehnder modulator comprises 3 dB couplers.

5. The electro-optical modulator of claim 1, wherein: said monomode light waveguide modulator means comprises a directional coupler modulator.

6. The electro-optical modulator of claim 5, wherein: said directional coupler modulator has a coupling length and comprises electrodes disposed over the coupling length.

7. The electro-optical modulator of claim 5, wherein: said directional coupler modulator has a coupling length and comprises divided electrodes over the coupling length.

8. The electro-optical modulator of claim 1, and further comprising: an input monomode light waveguide coupled to said light input and an output monomode light waveguide coupled to said light output.

9. The electro-optical modulator of claim 1, wherein: said pressure-sensitive signal generator is an electrical voltage modulator.

10. The electro-optical modulator of claim 1, wherein: said pressure sensitive signal generator is an electrical current modulator.

11. The electro-optical modulator of claim 1, wherein: said pressure-sensitive signal generator is an acousto-electrical transducer.

12. The electro-optical modulator of claim 11, wherein: said transducer is a piezo-microphone.

13. The electro-optical modulator of claim 11, wherein: said acousto-electrical transducer is a magneto-electrical transducer.

14. The electro-optical modulator of claim 1, and further comprising: a transformer connected between said signal generator and said monomode light waveguide modulator.

15. The electro-optical modulator of claim 1, and in combination therewith:

a thick core optical fiber coupled to said light output to achieve a low transmission loss.

16. The electro-optical modulator of claim 1, and further comprising, in combination:
    a telephone exchange;
    a pair of light waveguides coupling said light input and said light output to said telephone exchange; and
    a telephone instrument, including said electro-optical light modulator,
    said telephone instrument connected to said exchange only via light waveguides and further not connected to an electrical supply.

17. The electro-optical modulator of claim 16, wherein:
    said telephone instrument comprises a base unit, a hand set and a hand set cord connecting said base and said hand set;
    said electro-optical light modulator is mounted in said hand set; and
    said light waveguides extend through said hand set cord.

18. The electro-optical modulator of claim 16, wherein:
    said telephone instrument comprises a base unit, a hand set and a hand set cord, said monomode light waveguide modulator mounted in said base unit;
    said pressure-sensitive signal generator is mounted in said hand set; and
    said hand set cord comprises electrical conductors connecting said output of said signal generator to said electrical input of said monomode light waveguide modulator.

19. The electro-optical modulator of claim 16, wherein:
    said telephone exchange comprises an electro-optical transducer coupled to that light waveguide which is coupled to said light input of said monomode light waveguide modulator, and an opto-electrical transducer coupled to that light waveguide which is coupled to said light output of said monomode light waveguide modulator.

20. An electro-optical light modulator comprising:
    a pressure-sensitive signal generator including an output and operable in response to the application of pressure to produce an electrical signal at said output, said pressure-sensitive signal generator further including an acousto-electrical elektret microphone comprising a wafer of piezo material, a plurality of electrodes and counterelectrodes on said wafer forming a plurality of capacitors, and means connecting said capacitors in series so that the voltages derived from the individual capacitors add to provide the electrical signal.

* * * * *